J. M. FAHNESTOCK.
STEERING WHEEL.
APPLICATION FILED DEC. 11, 1913.
1,210,157.
Patented Dec. 26, 1916.
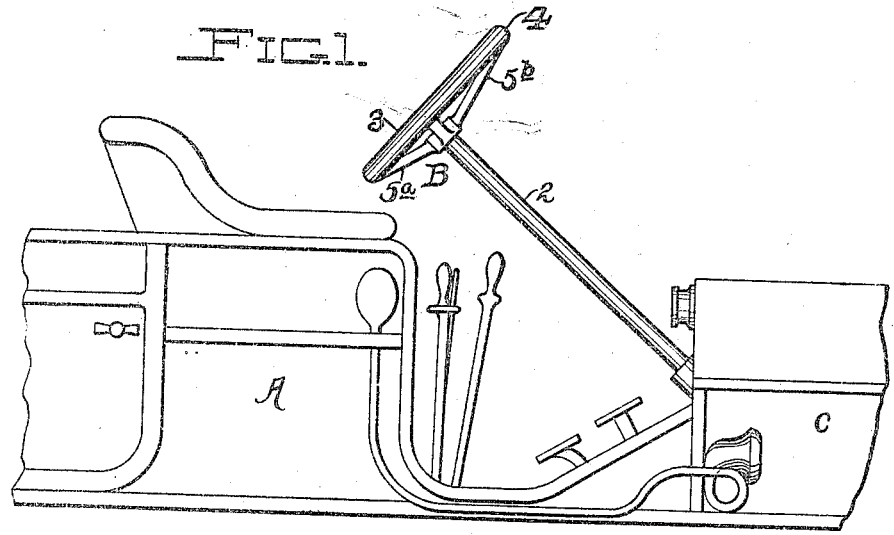
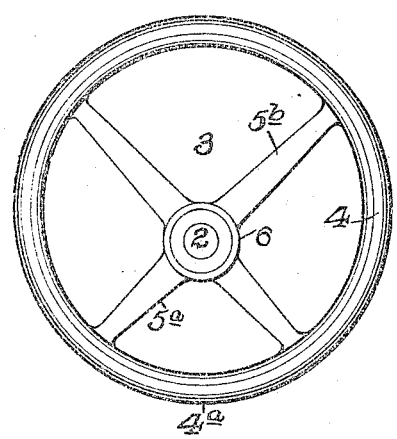
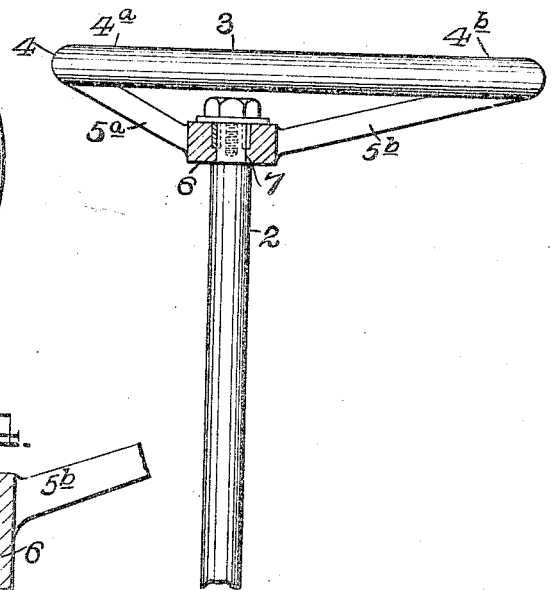
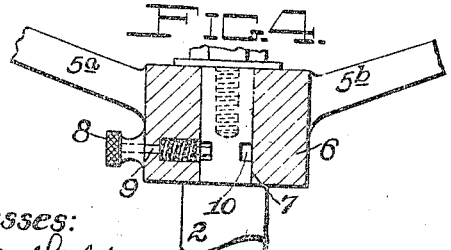
Witnesses:
Inventor:
James Murray Fahnestock,
By J. W. Cooke,
Attorney.

UNITED STATES PATENT OFFICE.

JAMES MURRAY FAHNESTOCK, OF PITTSBURGH, PENNSYLVANIA.

STEERING-WHEEL.

1,210,157.  Specification of Letters Patent.  Patented Dec. 26, 1916.

Application filed December 11, 1913. Serial No. 805,962.

*To all whom it may concern:*

Be it known that I, JAMES MURRAY FAHNESTOCK, a citizen of the United States, and a resident of Pittsburgh, (North Side,) in the county of Allegheny and State of Pennsylvania, have invented a new and useful Improvement in Steering-Wheels; and I do hereby declare the following to be a full, clear, and exact description thereof.

My invention relates to automobiles, aeroplanes or any mechanism having steering or guiding apparatus and relates particularly to the steering wheel of the same which is made in such a form as to permit of an adjustment of the distance of the same from the driver's seat without any change or adjustment in the position of the steering shaft.

The object of my invention is to provide a cheap, simple and efficient form of steering wheel wherein an easy adjustment may be made to suit the taste of the driver.

A further object is to provide a wheel which will be adapted to the personal taste of any driver in that it may be adjusted to a position close to such driver's body or at a distance from the same as desired.

My invention consists, generally stated, in the novel arrangement and construction as hereinafter set forth and described and particularly pointed out in the claim.

To enable others skilled in the art to which my invention appertains to construct, use and operate my improved steering wheel I will describe the same more fully referring to the accompanying drawing, in which:—

Figure 1 is a partial side view of an automobile showing the location of the steering shaft and wheel. Fig. 2 is a plan view of my improved steering wheel. Fig. 3 is a side elevation of the same. Fig. 4 is a partial sectional view showing the preferred latch arrangement.

Like symbols of reference herein indicate like parts in each of the figures of the drawing.

As illustrated in the drawing the automobile A is equipped with the usual seats the forward one 1 of which is occupied by the driver and before which the steering mechanism B is located. This steering apparatus B has a steering shaft or rod 2 at the upper end of which a steering wheel 3 is secured for the purpose of steering the automobile through the medium of the mechanism ordinarily arranged beneath the body C of the automobile and not shown.

The steering wheel 3 has a rim 4 which is substantially circular and which may be of any desired material. This rim is provided with short arms $5^a$ and long arms $5^b$ which extend inwardly from the same and to a hub 6 which is cast integrally therewith so that the hub constitutes a socket 7 for fitting over the end of the steering shaft 2 to which it is connected by the ordinary suitable means of connection. This arrangement of the hub 6 and arms or spokes $5^a$ and $5^b$ provides an eccentric steering wheel which may be adjusted with the one side of the rim $4^a$ at a short distance from the socket 7 or with the other side of the rim $4^b$ a greater distance from said socket depending on the difference of length of the said arms $5^a$ and $5^b$.

The steering wheel is provided with a latch member 8 which is spring actuated and permits of the pin 9 thereon entering or being withdrawn from the keyway or hole 10 in order to either hold the said wheel in a rigid position as regards the shaft or else when operated it will allow the wheel to be swung around so that the pin 9 will enter the other slot or hole 10. If desired, the steering wheel may be secured to the shaft 2 by a set screw or with feather keys or the end of the shaft may be made square to fit into a square socket in the hub of the wheel.

It will readily be seen that the hub need not be located any great amount off center since the adjustment acquired will be twice the amount of the "off center" location. For instance, if the hub were located one inch off center there would be an adjustment of two inches from the driving seat.

Practical experiments have shown that 90% of the driving or steering of automobiles is done without turning the steering wheel through a greater angle than 45 degrees to one side or the other so that the distance of the rim from the driver would never be materially changed.

It is very difficult and expensive to provide the necessary mechanism for an adjustable steering shaft while with my improved steering wheel the distance from the driver to the same could very easily be regulated without any additional labor or expense. This same purpose has sometimes been accomplished by changing the thickness of the cushions on the driver's seat but this has been found to be impracticable as the proper sizes or thicknesses of cushions may not always be at hand, while with my eccentric spider the steering wheel may be adjusted in a moment's time.

Various modifications and changes in the design and construction of my improved eccentric steering wheel may be resorted to such as numerous methods of holding the steering wheel to the shaft without departing from the spirit of the invention or sacrificing any of its advantages.

What I claim as my invention and desire to secure by Letters Patent is:—

In an automobile, a driver's seat, a steering shaft having a pair of diametrically opposed apertures adjacent the end thereof, a steering wheel mounted on said steering shaft so as to be accessible from said seat, said steering wheel having an eccentric hub, and a pin carried by said hub and adapted to enter one or the other of said apertures, for the purposes set forth.

In testimony whereof, I the said JAMES MURRAY FAHNESTOCK have hereunto set my hand.

JAMES MURRAY FAHNESTOCK.

Witnesses:
T. B. HUMPHRIES,
J. N. COOKE.